(12) United States Patent
Schweiggart et al.

(10) Patent No.: US 12,463,493 B2
(45) Date of Patent: Nov. 4, 2025

(54) COVERING MEANS FOR A COMPONENT OF AN ELECTRICAL DRIVE SYSTEM, AND COMPONENT PROVIDED THEREWITH

(71) Applicant: Reinz-Dichtungs-GmbH, Neu-Ulm (DE)

(72) Inventors: Franz Schweiggart, Neu-Ulm (DE); Giacomo Giaimi, Neu-Ulm (DE); Brian Heath, Neu-Ulm (DE); Christoph Specht, Neu-Ulm (DE); Alessandro Falzone, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 223 days.

(21) Appl. No.: 18/360,664

(22) Filed: Jul. 27, 2023

(65) Prior Publication Data

US 2024/0039358 A1    Feb. 1, 2024

(30) Foreign Application Priority Data

Jul. 28, 2022  (DE) .................... 20 2022 104 286.1

(51) Int. Cl.
  *H02K 5/02*   (2006.01)
  *H02K 5/24*   (2006.01)

(52) U.S. Cl.
  CPC ................ *H02K 5/02* (2013.01); *H02K 5/24* (2013.01)

(58) Field of Classification Search
  CPC ....... B32B 11/08; B32B 15/043; B32B 15/06; B32B 15/08; B32B 15/095; B32B 15/14; B32B 2255/06; B32B 2255/205; B32B 2262/101; B32B 2307/102; B32B 2307/7376; B32B 2457/00; B32B 3/30; B32B 7/08; B32B 7/10; B32B 7/12; G10K 11/168; H02K 5/02; H02K 5/24; H02M 7/003
See application file for complete search history.

(56) References Cited

U.S. PATENT DOCUMENTS

| | | | | |
|---|---|---|---|---|
| 4,522,165 | A  * | 6/1985 | Ogawa ................... | B32B 5/245 181/204 |
| 2011/0095659 | A1* | 4/2011 | Hattori ............... | H05K 7/14322 310/68 D |
| 2013/0157028 | A1* | 6/2013 | Blanchard ............ | B32B 19/043 428/219 |
| 2018/0226858 | A1* | 8/2018 | Mas ....................... | F04D 19/002 |
| 2019/0139528 | A1* | 5/2019 | Lee ...................... | F04B 39/0072 |
| 2020/0189242 | A1* | 6/2020 | Cai ........................ | E04F 15/203 |

FOREIGN PATENT DOCUMENTS

| | | | | | |
|---|---|---|---|---|---|
| CA | 1313288 | C | * | 1/1993 | ............. F02F 7/006 |
| CN | 107104534 | A | * | 8/2017 | ................ C08L 7/00 |
| CN | 113250817 | A | * | 8/2021 | ............. B32B 17/02 |
| DE | 19640903 | C1 | * | 5/1998 | ............. B32B 19/04 |
| JP | 09261914 | A | * | 10/1997 | ............. H02K 5/148 |

OTHER PUBLICATIONS

CN-107104534-A, all pages (Year: 2017).*
CN-113250817-A, all pages (Year: 2021).*
JP-09261914-A, all pages (Year: 1997).*
CA-1313288-C, all pages (Year: 1993).*

* cited by examiner

*Primary Examiner* — Naishadh N Desai
(74) *Attorney, Agent, or Firm* — McCoy Russell LLP (57) ABSTRACT

A covering means is provided for a component of an electrical drive system having or consisting of a first metallic layer, wherein the first metallic layer is equipped to be vibration-damping.

15 Claims, 9 Drawing Sheets

COVERING MEANS FOR A COMPONENT OF AN ELECTRICAL DRIVE SYSTEM, AND COMPONENT PROVIDED THEREWITH

CROSS-REFERENCE TO RELATED APPLICATION

The present disclosure claims priority to German Utility Model Application No. 20 2022 104 286.1, entitled "COVERING MEANS FOR A COMPONENT OF AN ELECTRICAL DRIVE SYSTEM, AND COMPONENT PROVIDED THEREWITH", and filed Jul. 28, 2022. The entire contents of the above-listed application is hereby incorporated by reference for all purposes.

TECHNICAL FIELD

The present disclosure relates to a covering means, for instance a housing, for a component of an electrical drive system, and also to a component provided therewith. Such components are for example the electric motor or the inverter of an electric motor. Both the inverter and the electric motor itself generate noise at high frequencies, for example between 6 kHz and 12 kHz, due to the switch elements used in them. These noises escape to the exterior and are disruptive in terms of both frequency and volume. Usually, these noises are kept away from the passenger compartment by equipping the engine compartment with noise-reducing insulation or by designing the passenger compartment so that it is sufficiently shielded from external noises. Both measures require a major outlay for noise reduction and are very cost-intensive.

BACKGROUND AND SUMMARY

The aim must therefore be to reduce the weight of the insulation, to simplify manufacture and to improve the costs of the damping measures. The object of the present disclosure is therefore to make available inexpensive, low-weight measures which are simple to produce for reducing noise of an electric motor or one of its components.

This object is achieved by a covering means and also by the inverter or electric motor as described herein.

According to the present disclosure, a covering means for a component of an electrical drive system which has precisely one or several first metallic layers is proposed. Such components may be an electric motor or an inverter. According to the present disclosure, this metallic layer is now directly equipped to be vibration-damping. Owing to the direct equipping of the metallic layer with vibration-damping features, it is possible to keep the weight and the costs of the additional vibration damping low and to achieve good acoustics or noise and vibration damping.

With the present covering means according to the present disclosure, for example sound waves of between 6 and 12 kHz, such as resonant bending waves, emerging from the interior of a housing around a component of an electrical drive are damped, so that overall resonant vibrations are damped or are incited only slightly or not incited at all.

For example, this first metallic layer may be provided, for instance coated, at least in regions, with a vibration-damping material on one of the surfaces of the metallic layer, such as on its outer side, but also alternatively or additionally on its inner side. Any available coating method, such as application by nozzle or by doctor blade, may be considered as a coating method. The coating achieves good vibration damping while at the same time achieving simple production, good mouldability and low costs. Silicone-based or polyurethane-based materials, alternatively also rubber-based, bitumen-based or resin-based materials, are suitable as vibration-damping material. The vibration-damping material may contain further additives, such as a mineral additive.

Alternatively or additionally, the vibration-damping material may also include a further metallic layer or a fibre mat. This further layer may also be present only in regions, as a result of which both the technical properties such as weight and acoustic damping and vibration damping and also the costs of the element can be adapted optimally and in a customised manner. The embodiment may accordingly be to equip the first metallic layer in regions with vibration-damping material such as for example polyurethane adhesive, on which a further metallic layer is then placed. The first metallic layer may also be coated with a metal, for instance with aluminium or zinc, on its outer side and/or inner side. Thus inter alia good protection of the covering means according to the present disclosure against corrosion is achieved.

An improvement in the sound insulation is achieved by the first metallic layer having in regions a dimpled and/or ribbed and/or cross-ribbed texture.

Lightweight and inexpensive sound insulation may be achieved in that the first metallic layer has one or more regions in which the thickness of the metallic layer, compared with the surrounding regions or compared with the thickness of the metal sheet material used for producing the first metallic layer, is reduced or the first metallic layer even has a cutout. Thus the vibration behaviour of the covering means can be configured such that the vibration damping described above is achieved or improved. The covering means can be configured to be vibration-damping such that exclusively one, a plurality of or all these regions are configured or equipped to be vibration-damping.

For example one, a plurality of or all these regions may have a cutout, with a diaphragm, such as a diaphragm made of a metal, being arranged on the inner side, encircling the peripheral edge (32) of the respective cutout and completely covering the cutout. This second metal is injection-moulded or glued onto the peripheral edge with the aid of an elastomer. These diaphragms, owing to their gluing-on or encircling encompassing with elastomer, have a different vibration response and resonance behaviour, and thus reduce the vibrations produced in the covering means or shift the resonant frequencies into a non-critical frequency range. At the same time, they ensure fluid-tight sealing of the cutouts.

If the first metallic layer of the covering means, e.g. of a housing cover, is also coated in the contact region, for instance along one or two lines running around along the peripheral edge of the first metallic layer, with a further element, e.g. a housing pan, the vibration damping for the entire arrangement, here e.g. of a housing, can be improved further.

The present disclosure may relate also to an electric motor or an inverter of an electric motor as components of an electrically-powered drive having a covering means according to the present disclosure, such as having a housing which contains a covering means according to the present disclosure.

Below, some examples of covering means according to the present disclosure, for instance housings, and also drive components according to the present disclosure, are given. Here, identical and similar elements are provided with identical and similar reference numerals, without their description being repeated. In the examples below, a multiplicity of optional features are combined to form the essential features according to the present disclosure. These optional features can also be used individually or in any combination with other optional features of the same example or a different example, in order to further develop the present disclosure.

DETAILED DESCRIPTION

FIGS. 1A-1D show an electric motor 2 with a casing 1. This casing 1 has a housing cover 4a and a housing body 4b. The housing 4a, 4b in this case at least partially surrounds the electric motor 2. Both housing parts 4a and 4b have a first metallic layer of hot-dip aluminised steel 10 which imparts mechanical stability to these housing parts. Alternatively, the housing parts may also consist of high-grade steel, aluminium or galvanised steel.

Figure 1A:
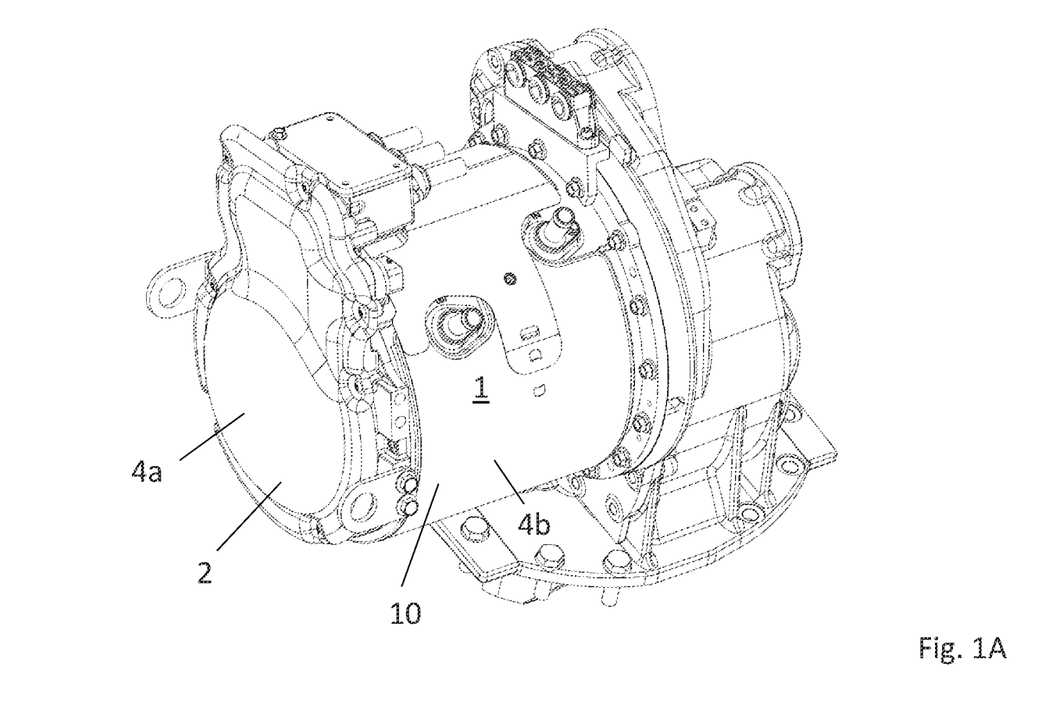
FIGS. 1A-1D show an electric motor with housing.
Figure 1B:
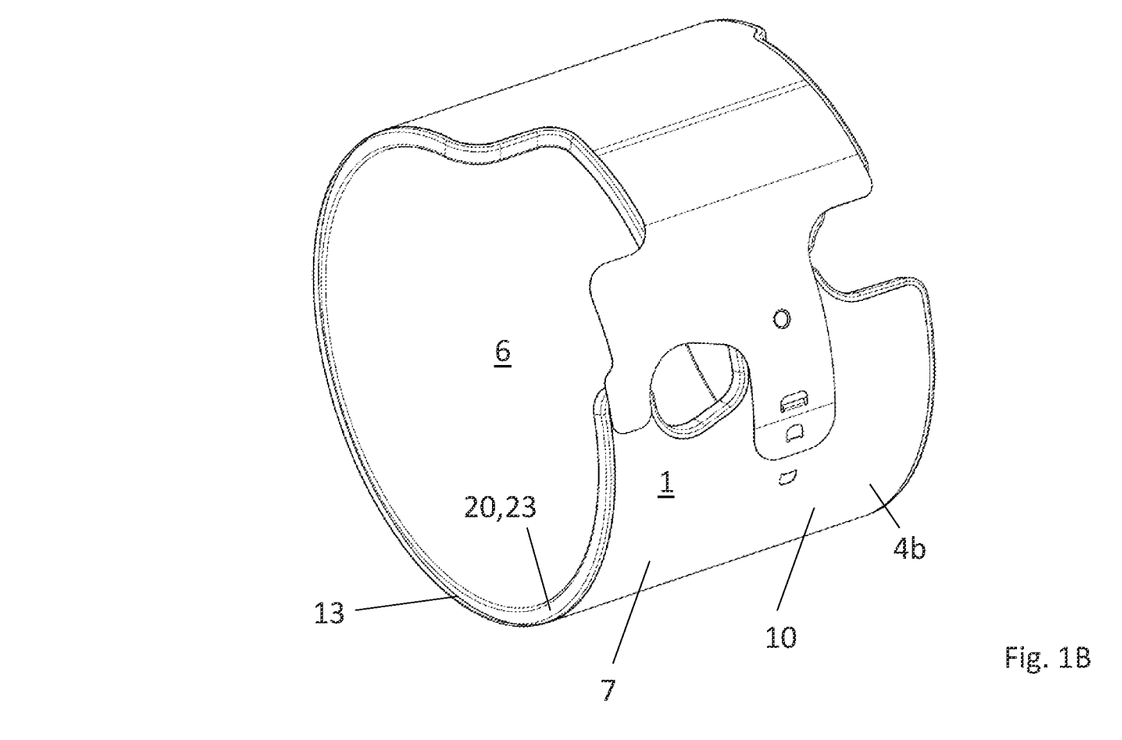

Whereas FIG. 1A shows a top view of the electric motor with the housing parts 4a and 4b, e.g. a housing cover 4a and a housing body 4b, FIG. 1B illustrates merely a top view of the cylindrical housing body 4b. This is configured according to the present disclosure in that it has a first metallic layer 10, with an inner side 11 (which is on the side of the inner side 6 of the housing body 4b) facing the electric motor and an opposing outer side 12 (which is on the side of the outer side 7 of the housing body 4b). The housing body 4b has a peripheral edge 13 against which the housing cover 4a can lie on the left-hand side.

The housing body 4b is lined according to the present disclosure on its inner side 6 with a vibration-damping material 20, namely a glass fibre mat 23. The glass fibre mat may be Hakotherm®, a needle-punched nonwoven made of glass fibres. This glass fibre material is applied to the first metallic layer 10 by means of an adhesive, in the present example a polyurethane-based adhesive, namely Sikaflex® 2 or Sikaflex® 265, these product designations being valid at the time of the application for this present disclosure.

Figure 1C:
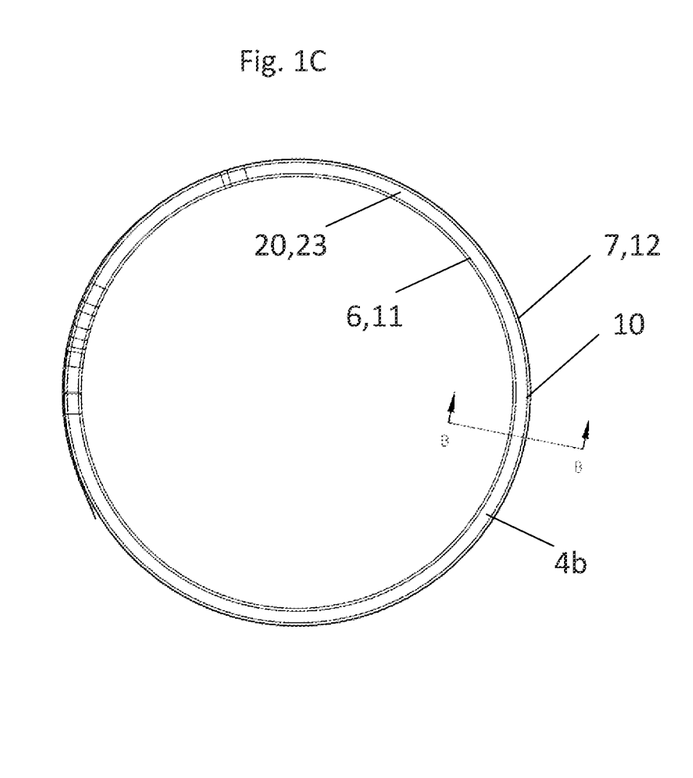
Figure 1D:
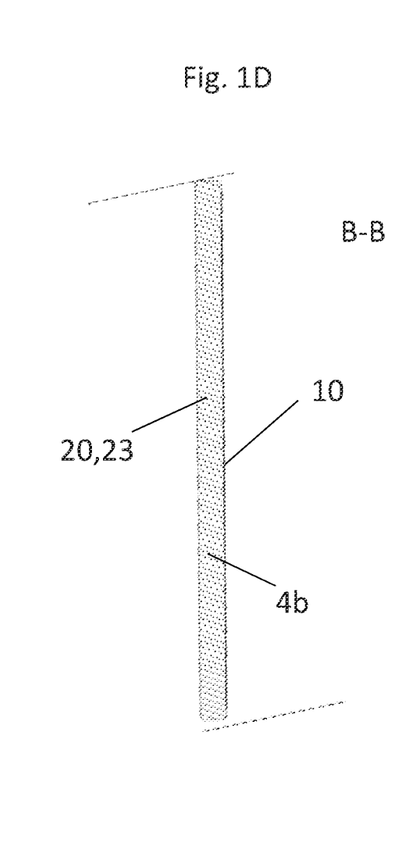

FIG. 1C shows the housing body 4b in cross-section transversely to the longitudinal axis of the cylindrical housing body 4b (FIG. 1C). FIG. 1D shows the housing body 4b in cross-section along the line B-B in FIG. 1C (FIG. 1D).

Figure 2A:
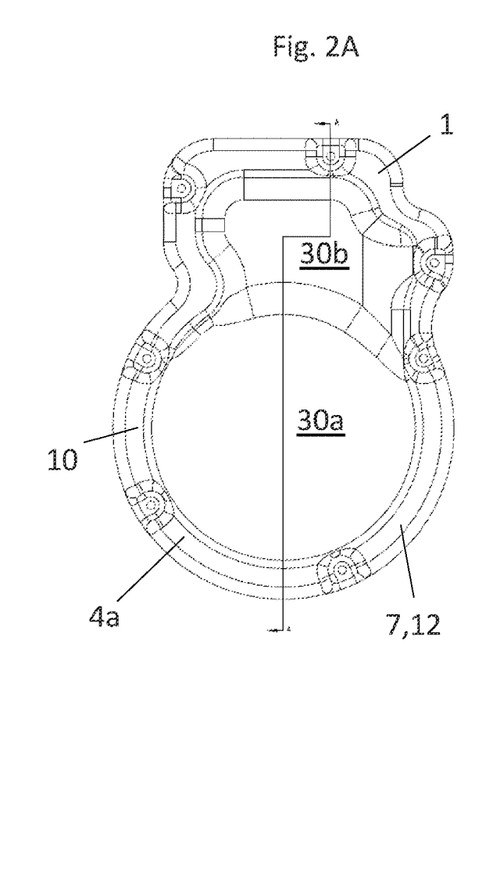
FIGS. 2A-2C show the housing cover of the housing of FIGS. 1A-1D.
Figure 2B:
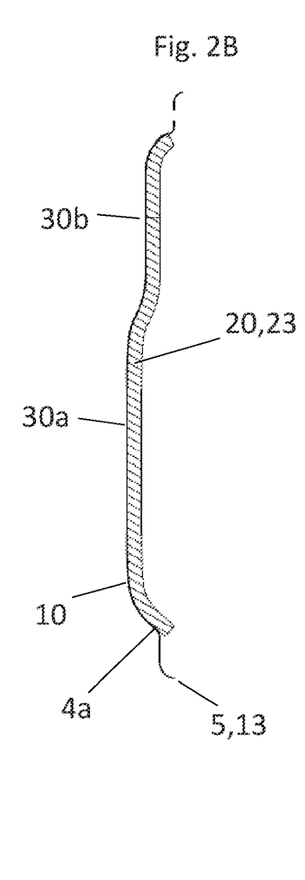
Figure 2C:
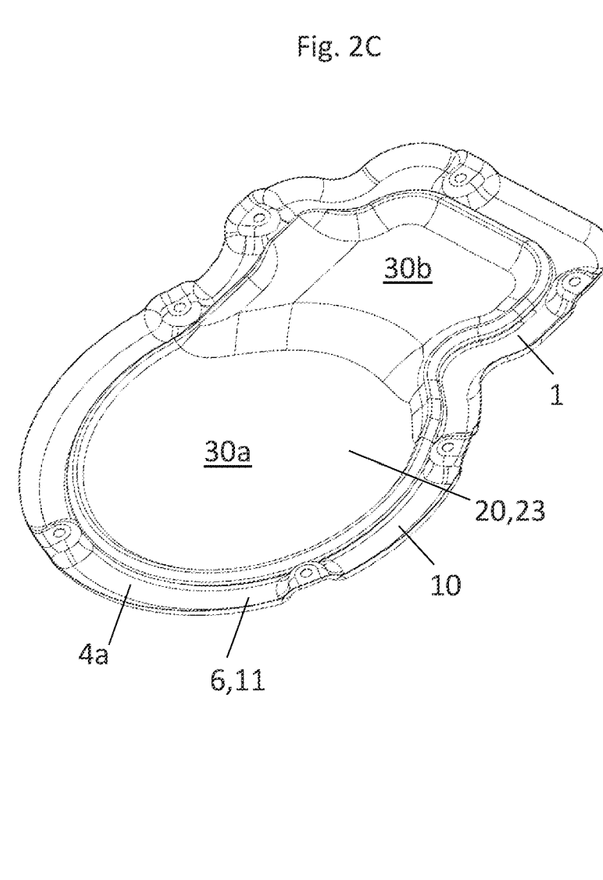

The housing cover 4a of FIGS. 1A-1D is illustrated in greater detail in FIGS. 2A-2C.

FIG. 2A shows a top view of the housing cover 4a, FIG. 2B a cross-section along the line A-A in FIG. 2A, and also FIG. 2C shows a view of the housing cover 4a onto the inner side 6 of the cover 4a.

The housing cover 4a, just like the housing body 4b, has a first metallic layer 10. This metallic layer 10 has regions 30a, 30b in which the metallic layer 10 has elevated, convex regions. On the first metallic layer 10 is arranged a fibre mat 23, made of the same material as the glass fibre mat 23 of the housing body 4b in FIGS. 1A-1D, as a sound-insulating and vibration-damping material 20. The glass fibre mat 23, just as in FIGS. 1A-1D, is glued to the first layer. Alternatively, the glass fibre mat may also be stapled on, or firmly clamped by, an additional metallic layer which is formed integrally with the first metallic layer 10.

Figure 3A:
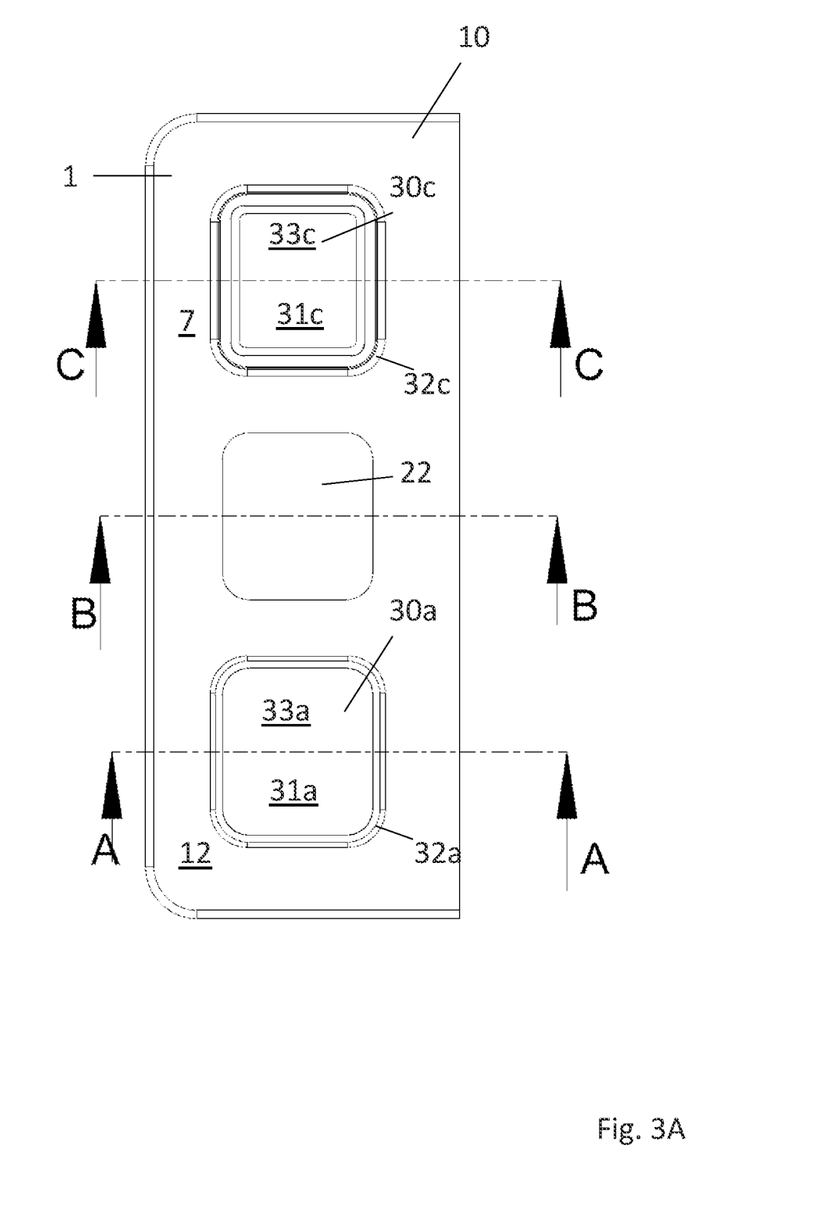
FIGS. 3A-3G show a detail of a covering means.
Figure 3B:
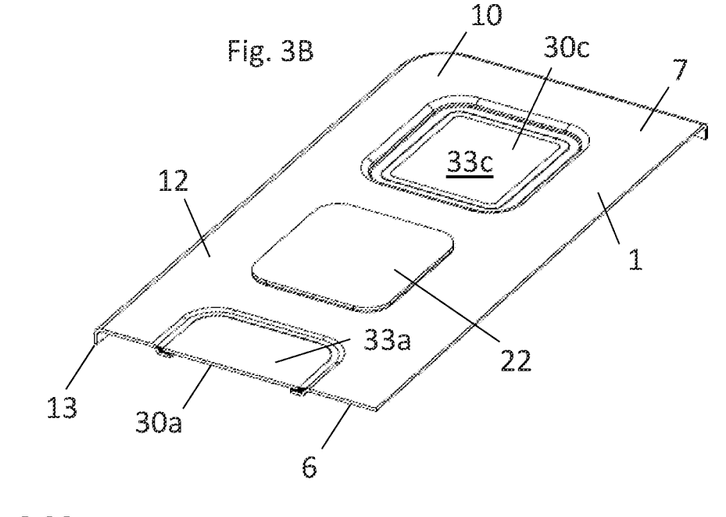
Figure 3C:
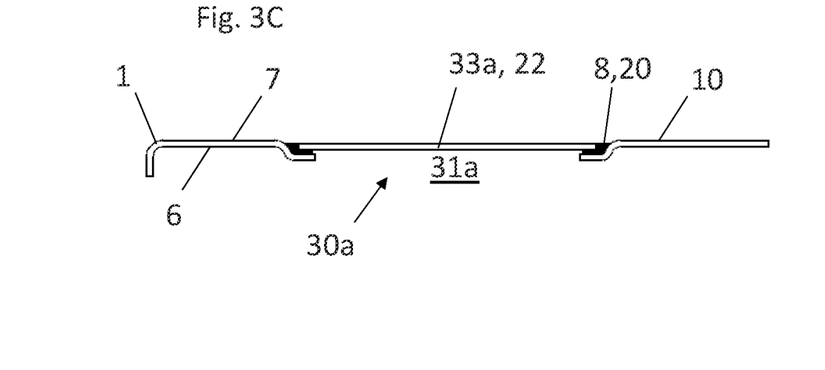

FIGS. 3A-3G show a covering means 1 for an electric motor or an inverter or other component of an electrically-powered drive, in which three different sound-insulating measures according to the present disclosure are carried out. Whereas FIG. 3A shows a top view in detail of the outer side 7 of the covering means 1, FIG. 3B shows a top view in section along the line A-A in FIG. 3A, FIG. 3C a cross-section along the line A-A in FIG. 3A, FIG. 3D a top view in cross-section of the line B-B in FIG. 3A, FIG. 3E a cross-section along the line B-B in FIG. 3A, FIG. 3F a top view in cross-section along the line C-C in FIG. 3A, and FIG. 3G a cross-section along the line C-C in FIG. 3A.

FIG. 3A illustrates a first region 30a, in which the metallic layer 10 has a rectangular region 30a with rounded corners. FIG. 3B shows a top view of a cross-section and FIG. 3C a cross-section in this region along the line A-A. In the cross-section A-A, the first metallic layer 10 has a region 30a with a cutout 31a. The cutout 31a has a largely square peripheral edge 32a with rounded corners which is offset towards the inner side 6. Within the cutout 31a and completely covering it and glued on the peripheral edge 32a, encircling it, by injection-moulded elastomer 8, which here at the same time represents the vibration-damping material 20, there is a diaphragm 33a, here consisting of hot-dip aluminised steel, or may be of material identical to the first metallic layer 10. This diaphragm consequently completely covers the opening 31a and seals off in a fluid-tight manner between the inner side 11 and the outer side 12 of the metallic layer 10 with the aid of the injection-moulded elastomer 8. The term "diaphragm" is understood here to mean a system capable of vibration similarly to a loudspeaker diaphragm. In this case, a metal which above all has a vibration-damping effect due to its injection-moulded elastomer is used as the material within the meaning of this present disclosure.

Figures 3D, 3E:
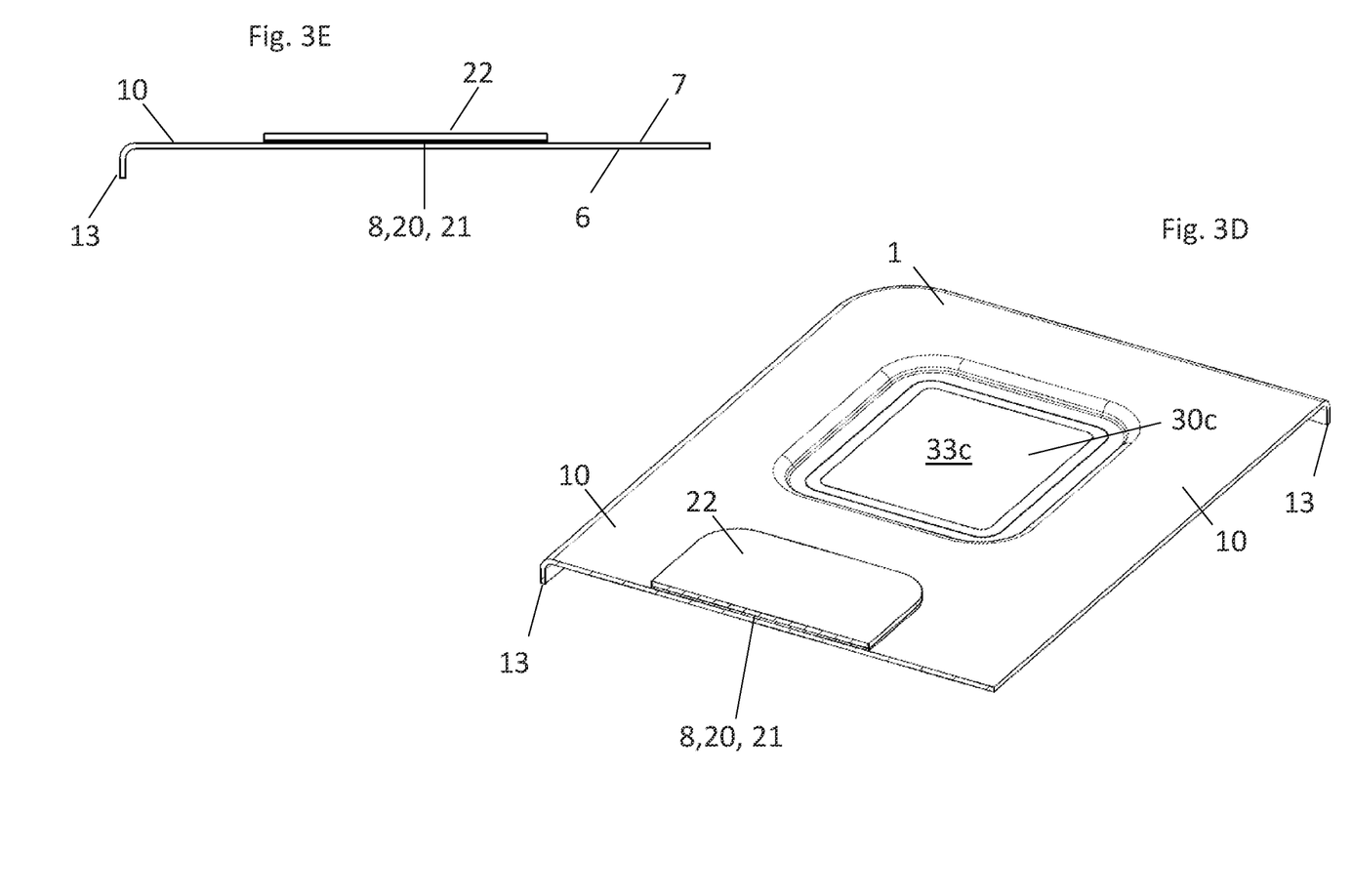

FIG. 3D and FIG. 3E show a cross-section between the regions 30a and 30c along the line B-B in FIG. 3A. The metallic layer 10 is provided in this region with an external sound-insulating coating 21, consisting of an elastomer layer 8, here acting as a vibration-damping layer and with a further metallic layer 22. This sound-insulating coating with a further metallic layer may however equally well be arranged on the inner side.

Figures 3F, 3G:
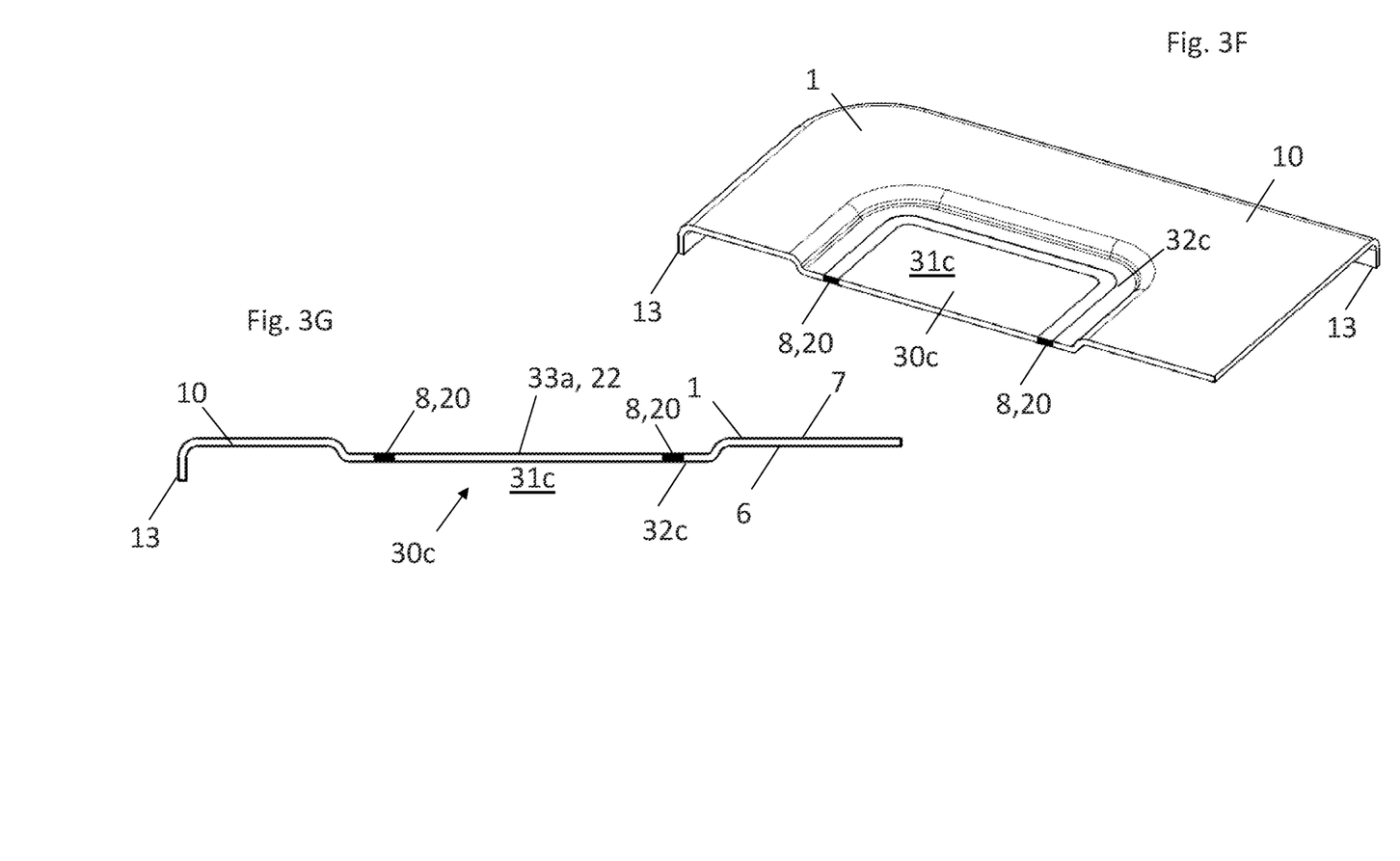

FIG. 3F and FIG. 3G show a section around a further region 30c along the line C-C in FIG. 3A. In the region 30c, the metallic layer 10 has a cutout 31c in which a diaphragm 33c is arranged. As in FIGS. 3B and 3C, this diaphragm consists of a hot-dip aluminised steel which is connected via an injection-moulded elastomer 8, 20 to the offset peripheral edge 32c of the cutout 30c. The diaphragm 33c closes off in a fluid-tight manner on the edge 32c due to the injection-moulded elastomer between the inner side 11 and the outer side 12 of the metallic layer Unlike the portion 30a, the diaphragm 33c is now arranged in the plane of the outermost peripheral edge 32c, e.g. encircling completely in the offset plane of the metallic layer 10 between the peripheral edge 32c. The offsetting is however not imperative: rather, the diaphragm may also be arranged in a plane with the first layer 10. What is important with this embodiment is that the peripheral edge and the diaphragm used do not overlap.

The common advantage of the embodiments of FIGS. 3A to 3F is that the vibration-damping measures can be carried out in part here. That is to say that the glued-on metals or the diaphragms used may be sized and offset on the covering means according to requirements.

Figure 4:
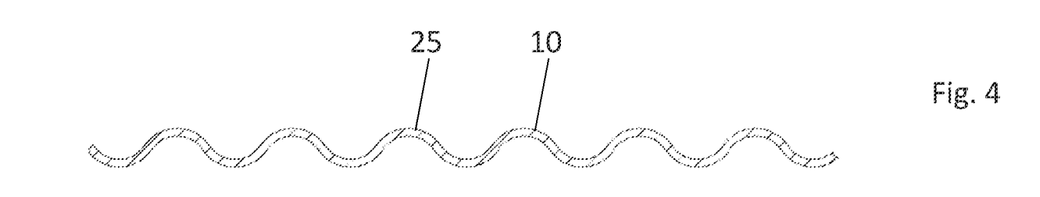
FIG. 4 shows a first layer with texturing.

FIG. 4 shows a metallic layer 10 with exemplified texturing 25, here dimpling. The first metallic layer 10 in each of the examples of embodiment illustrated previously may also be dimpled, ribbed or cross-ribbed or otherwise textured.

Figure 5:
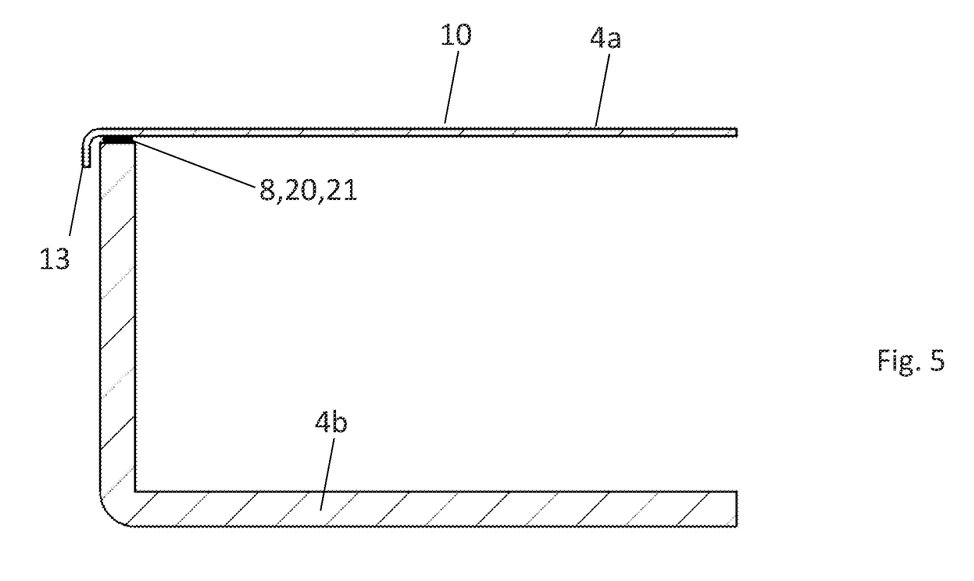
FIG. 5 shows a housing cover with a housing pan in cross-section.

FIG. 5 shows a cross-section through a covering means 1 according to the present disclosure as a housing cover 4a, which is connected to the housing body 4b along the peripheral edge 13 by elastomer 8, which at the same time acts as a vibration-damping material 20. This may be done in addition to other measures according to the present disclosure, and improves the vibration-damping effect.

The invention claimed is:

1. A covering means for a component of an electrical drive system having or consisting of a first metallic layer,
 wherein the first metallic layer is equipped to be vibration-damping,
 wherein the first metallic layer has first regions in which the first metallic layer has at least one cutout, and
 wherein for one, a plurality of, or all of the first regions, the first region has a cutout, with a diaphragm being arranged encircling the peripheral edge of the cutout and/or completely covering the cutout.

2. The covering means according to claim 1, wherein the first metallic layer is provided at least in regions with a vibration-damping material on one of the surfaces of the metallic layer.

3. The covering means according to claim 2, wherein the vibration-damping material is or contains silicone-based or polyurethane-based material.

4. The covering means according to claim 2, wherein the vibration-damping material contains rubber or bitumen.

5. The covering means according to claim 2, wherein the vibration-damping material contains a mineral additive.

6. The covering means according to claim 1, wherein the vibration-damping material is or contains a further metallic layer or a fibre mat.

7. The covering means according to claim 6, wherein the vibration-damping material is glued to, laid on, soldered on or welded to the first metallic layer.

8. The covering means according to claim 1, wherein the covering means is a housing.

9. The covering means according to claim 8, wherein the housing is equipped to be vibration-damping such that vibrations, incited by sound waves, of between 6 and 12 kHz emerging from the interior of the housing in the housing are damped.

10. The covering means according to claim 1, wherein the first metallic layer is coated on the outer side and/or inner side of the covering means with a metal.

11. The covering means according to claim 1, wherein the first metallic layer in regions has a dimpled and/or ribbed and/or cross-ribbed texture.

12. The covering means according to claim 1, wherein for one, a plurality of or all the first regions, the first region has a reduced thickness and is equipped to be vibration-damping.

13. The covering means according to claim 1, wherein for one, a plurality of or all the first regions the diaphragm is injection-moulded or glued onto the peripheral edge of the cutout.

14. The covering means according to claim 1, wherein the first metallic layer in the contact region with a further element is coated.

15. An electric motor or inverter of an electric motor, wherein it has a covering means according to claim 1 which surrounds an electric motor or an inverter of the electric motor at least in regions.

* * * * *